United States Patent
Oka et al.

(10) Patent No.: US 12,510,886 B2
(45) Date of Patent: Dec. 30, 2025

(54) MONITORING DEVICE AND MONITORING METHOD

(71) Applicant: MITSUBISHI HEAVY INDUSTRIES, LTD., Tokyo (JP)

(72) Inventors: Hirotaka Oka, Tokyo (JP); Masumi Nomura, Tokyo (JP); Tatsuo Ishiguro, Tokyo (JP); Katsuaki Morita, Tokyo (JP); Ryuji Ikeda, Tokyo (JP); Kenichi Nagahara, Tokyo (JP); Sota Kogawa, Tokyo (JP); Noriyuki Matsukura, Tokyo (JP); Satoshi Nikaido, Tokyo (JP); Yuki Nishizaki, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 395 days.

(21) Appl. No.: 18/017,908

(22) PCT Filed: Jul. 29, 2021

(86) PCT No.: PCT/JP2021/028006
§ 371 (c)(1),
(2) Date: Jan. 25, 2023

(87) PCT Pub. No.: WO2022/025149
PCT Pub. Date: Feb. 3, 2022

(65) Prior Publication Data
US 2023/0280735 A1    Sep. 7, 2023

(30) Foreign Application Priority Data
Jul. 31, 2020  (JP) ................. 2020-130789

(51) Int. Cl.
*G05B 23/02*      (2006.01)

(52) U.S. Cl.
CPC ....... *G05B 23/0221* (2013.01); *G05B 23/027* (2013.01); *G05B 23/0275* (2013.01); *G05B 23/0294* (2013.01)

(58) Field of Classification Search
CPC ............. G05B 23/0221; G05B 23/027; G05B 23/0275; G05B 23/0294; G05B 23/0283
See application file for complete search history.

(56) References Cited

U.S. PATENT DOCUMENTS

| 7,457,725 | B1 * | 11/2008 | Civilini | G05B 23/0283 |
| | | | | 702/183 |
| 7,475,299 | B1 * | 1/2009 | Brenes | H04L 41/0681 |
| | | | | 714/704 |

(Continued)

FOREIGN PATENT DOCUMENTS

JP    6474564 B2    2/2019

OTHER PUBLICATIONS

International Search Report issued in Application No. PCT/JP2021/028006 mailed on Oct. 19, 2021 (4 pages).

(Continued)

*Primary Examiner* — Manuel A Rivera Vargas
(74) *Attorney, Agent, or Firm* — Osha Bergman Watanabe & Burton LLP (57) ABSTRACT

A monitoring device includes: an operation record acquisition unit configured to acquire operation records indicating a transition in a load factor or a load change factor with respect to operation time leading up to failure in failure cases; a threshold setting unit configured to set a threshold to be contrasted with the load factor or the load change factor in the operation records of the failure cases; a wear rate acquisition unit configured to acquire a wear rate that is a value derived from a relation between the load factor or the load change factor and the threshold and indicates a degree of progress of wear of a device according to operation time;

(Continued)

and a failure rate cumulative frequency acquisition unit configured to acquire a transition in a failure rate cumulative frequency of the failure cases with respect to the wear rate.

7 Claims, 7 Drawing Sheets

(56) References Cited

U.S. PATENT DOCUMENTS

| | | | | |
|---|---|---|---|---|
| 2006/0178854 | A1* | 8/2006 | Lindsay | B21B 38/008 |
| | | | | 702/177 |
| 2011/0054806 | A1* | 3/2011 | Goldfine | G07C 3/00 |
| | | | | 702/34 |
| 2020/0057107 | A1* | 2/2020 | Cho | G01R 31/3278 |
| 2021/0123833 | A1* | 4/2021 | Tobon-Mejia | G01H 1/003 |

OTHER PUBLICATIONS

Written Opinion issued in Application No. PCT/JP2021/028006 mailed on Oct. 19, 2021 (6 pages).

* cited by examiner

MONITORING DEVICE AND MONITORING METHOD

TECHNICAL FIELD

The present disclosure relates to a monitoring device, a monitoring method, and a recording medium storing a program. Priority is claimed on Japanese Patent Application No. 2020-130789, filed Jul. 31, 2020, the content of which is incorporated herein by reference.

BACKGROUND ART

In asset management services that ensure the value of equipment as assets by monitoring the soundness of devices and the like based on device and plant monitoring data and performing appropriate maintenance or improvement of operation methods, it is important to predict when the probability of occurrence of product wear-out failure will increase and to perform appropriate maintenance.

Since the past, time based maintenance (TBM) has been widely implemented to predict the probability of occurrence of wear-out failure with the operation period of a device as a reference based on a failure rate curve (so-called bathtub curve) in which the horizontal axis is the operation period of the device and the vertical axis is the probability of occurrence of failure.

In conventional TBM, a maintenance period is set without reflecting operational conditions, which may result in excessive maintenance costs for equipment with a low operating rate. In addition, conversely, extremely high load operations may cause unplanned failures before the maintenance period.

Consequently, the trend is toward condition based maintenance (CBM) in which abnormal device behavior is detected and then maintenance is performed.

Patent Document 1 adopts a method of evaluating an abnormality when there is an unexpectedly large residual between the multiple regression analysis of an observation value that is KPI in a normal case, a principal component analysis model, and an actual observation value, or the residual tends to increase.

CITATION LIST

Patent Literature

[Patent Literature 1]
Japanese Patent No. 6474564

SUMMARY OF INVENTION

Technical Problem

However, the period from when the abnormal behavior of a device becomes apparent to when the device stops is often short. For this reason, even with CBM, there may be cases in which unplanned stoppages or emergency maintenance responses are required.

The present disclosure was contrived in view of such circumstances, and an object thereof is to provide a monitoring device, a monitoring method, and a recording medium storing a program that make it possible to suppress the occurrence of excessive maintenance, unplanned stoppage, or the like, and to appropriately perform preservation and maintenance.

Solution to Problem

According to an aspect of the present disclosure, there is provided a monitoring device including: an operation record acquisition unit configured to acquire operation records indicating a transition in a load factor or a load change factor with respect to operation time leading up to failure in a plurality of failure cases; a threshold setting unit configured to set a threshold to be contrasted with the load factor or the load change factor in the operation records of the plurality of failure cases; a wear rate acquisition unit configured to acquire a wear rate that is a value derived from a relation between the load factor or the load change factor and the threshold and indicates a degree of progress of wear of a device according to operation time; a failure rate cumulative frequency acquisition unit configured to acquire a transition in a failure rate cumulative frequency of the plurality of failure cases with respect to the wear rate; an evaluation index calculation unit configured to calculate an evaluation index that is a value obtained by integrating the failure rate cumulative frequency with the wear rate; and a notification unit configured to notify that maintenance is required when the wear rate derived from the relation between the threshold and the load factor or the load change factor of the device to be monitored reaches a prescribed management value determined based on the transition in the failure rate cumulative frequency of the failure cases, wherein the threshold setting unit is configured to set the threshold so that the evaluation index is minimized.

According to an aspect of the present disclosure, there is provided a monitoring method including: a step of acquiring operation records indicating a transition in a load factor or a load change factor with respect to operation time leading up to failure in a plurality of failure cases; a step of setting a threshold to be contrasted with the load factor or the load change factor in the operation records of the plurality of failure cases; a step of acquiring a wear rate that is a value derived from a relation between the load factor or the load change factor and the threshold and indicates a degree of progress of wear of a device according to operation time; a step of acquiring a transition in a failure rate cumulative frequency of the plurality of failure cases with respect to the wear rate; a step of calculating an evaluation index that is a value obtained by integrating the failure rate cumulative frequency with the wear rate; and a step of notifying that maintenance is required when the wear rate derived from the relation between the threshold and the load factor or the load change factor of the device to be monitored reaches a prescribed management value determined based on the transition in the failure rate cumulative frequency of the failure cases, wherein the step of setting the threshold includes setting the threshold so that the evaluation index is minimized.

According to an aspect of the present disclosure, there is provided a non-transitory computer readable recording medium storing a program causing a computer to execute: a step of acquiring operation records indicating a transition in a load factor or a load change factor with respect to operation time leading up to failure in a plurality of failure cases; a step of setting a threshold to be contrasted with the load factor or the load change factor in the operation records of the plurality of failure cases; a step of acquiring a wear rate that is a value derived from a relation between the load factor or the load change factor and the threshold and indicates a degree of progress of wear of a device according to operation time; a step of acquiring a transition in a failure rate cumulative frequency of the plurality of failure cases with respect to the wear rate; a step of calculating an evaluation index that is a value obtained by integrating the failure rate cumulative frequency with the wear rate; and a step of notifying that maintenance is required when the wear rate derived from the relation between the threshold and the load factor or the load change factor of the device to be monitored reaches a prescribed management value determined based on the transition in the failure rate cumulative frequency of the failure cases, wherein the step of setting the threshold includes setting the threshold so that the evaluation index is minimized.

Advantageous Effects of Invention

According to the monitoring device, the monitoring method, and the recording medium storing the program of the present disclosure, it is possible to suppress the occurrence of excessive maintenance, unplanned stoppage, or the like, and to appropriately perform preservation and maintenance.

DESCRIPTION OF EMBODIMENTS

First Embodiment

Hereinafter, a monitoring device according to a first embodiment will be described in detail with reference to FIGS. 1 to 5.
(Functional Configuration of Standard Information Management Device)

Figure 1:
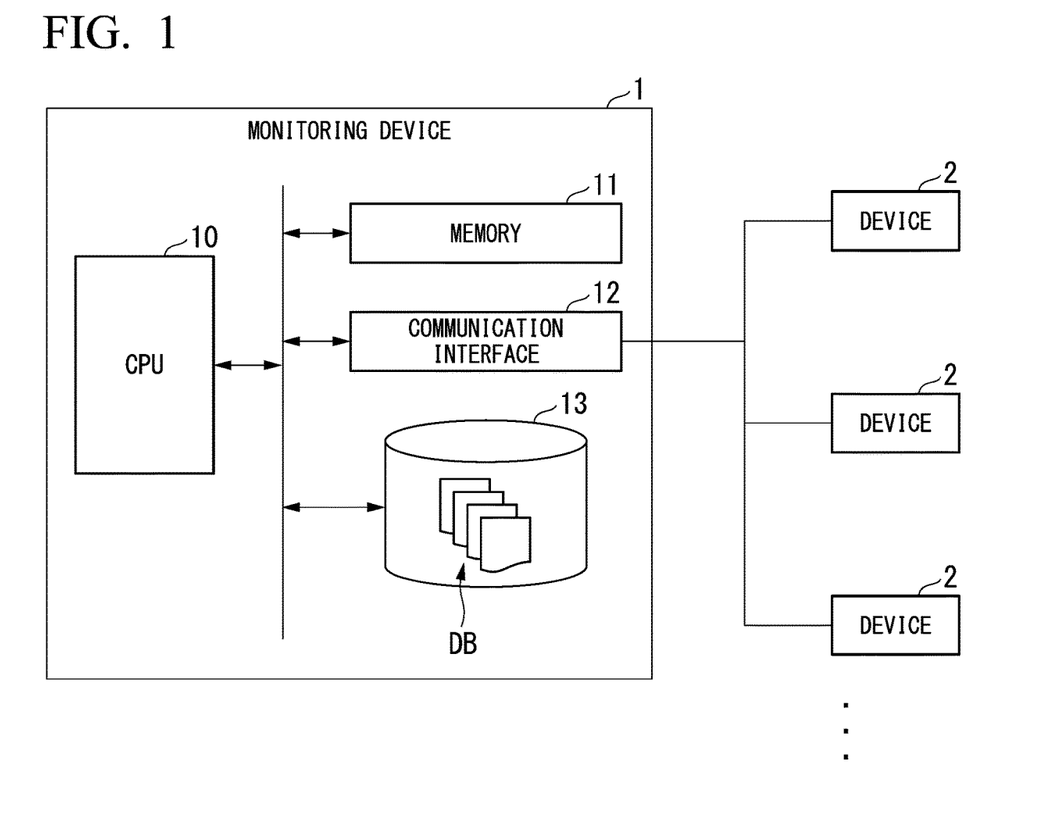
FIG. 1 is a diagram illustrating a configuration of a monitoring device according to a first embodiment.
Figure 2:
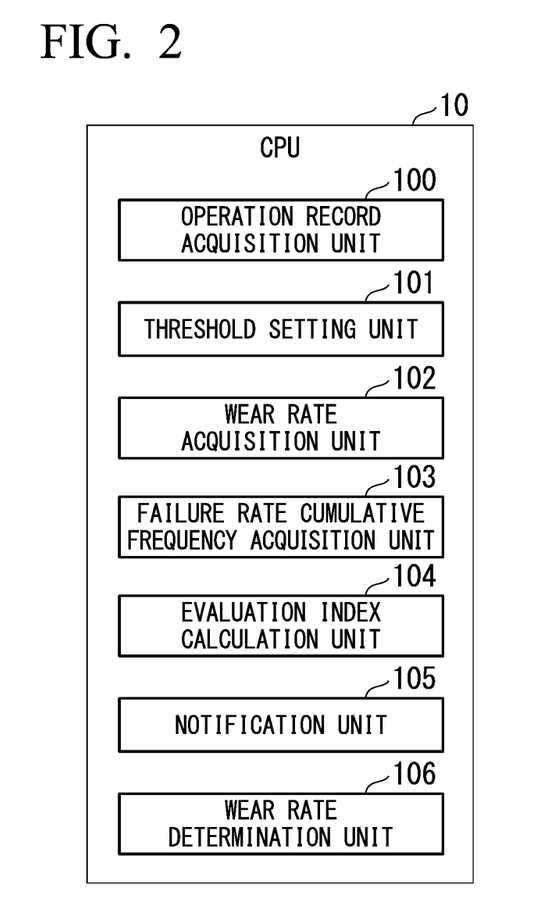
FIG. 2 is a diagram illustrating a configuration of the monitoring device according to the first embodiment.

FIGS. 1 and 2 are diagrams illustrating configurations of monitoring according to the first embodiment.

A monitoring device 1 shown in FIG. 1 monitors the operation states of devices 2 and issues a notification (alert) indicating that preservation and maintenance are required at an appropriate timing. Although the devices 2 to be monitored are large-sized refrigerating machines, submersible pumps, and the like in the present embodiment, there is no limitation thereto in other embodiments, and the monitoring device 1 can be applied to any device, equipment, or facility.

The monitoring device 1 receives a load factor or a load change factor during operation from the devices 2 from time to time, and issues an alert when a wear rate (which will be described later) calculated based on the load factor or the load change factor reaches a prescribed management value.

As shown in FIG. 1, the monitoring device 1 includes a CPU 10, a memory 11, a communication interface 12, and a recording medium 13.

The CPU 10 exhibits various functions by operating in accordance with a program prepared in advance. The details of the functions of the CPU 10 will be described later.

The memory 11 is a so-called main storage device, and provides a storage area necessary for the operation of the CPU 10.

The communication interface 12 is an interface that establishes a connection to a broadband communication network (such as the Internet).

The recording medium 13 is a non-volatile large-capacity storage area such as a hard disk drive (HDD) or a solid state drive (SSD). An operation record DB relating to a plurality of (about 100 to 500) failure cases of the devices 2 is recorded in the recording medium 13.
(Functional Configuration of CPU)

FIG. 2 is a diagram illustrating functions of the CPU of the standard information management device according to the first embodiment.

As shown in FIG. 2, the CPU 10 operates in accordance with a program prepared in advance to function as an operation record acquisition unit 100, a threshold setting unit 101, a wear rate acquisition unit 102, a failure rate cumulative frequency acquisition unit 103, an evaluation index calculation unit 104, a notification unit 105, and a wear rate determination unit 106.

The operation record acquisition unit 100 acquires the operation record DB of failure cases (devices 2 that were operated in the past and failed). The operation record DB shows a transition in the load factor or load change factor with respect to the operation time leading up to the failure of each of the devices 2.

The threshold setting unit 101 sets a threshold to be contrasted with the load factor or load change factor in the operation records of a plurality of failure cases.

The wear rate acquisition unit 102 acquires a wear rate indicating the degree of progress of wear of the device 2 according to the operation time. As will be described later, the wear rate is a value derived from the relation between the load factor or load change factor of the device 2 and the threshold set by the threshold setting unit 101.

The failure rate cumulative frequency acquisition unit 103 acquires a transition in the failure rate cumulative frequency of a plurality of failure cases with respect to the wear rate.

The evaluation index calculation unit 104 calculates an evaluation index that is a value obtained by integrating the failure rate cumulative frequency with the wear rate. Meanwhile, the above-described threshold setting unit 101 sets the threshold so that this evaluation index is minimized. The function of the threshold setting unit 101 will be described later.

The notification unit 105 issues a notification (alert) indicating that maintenance is required when the wear rate derived from the relation between the load factor or load change factor of the device 2 to be monitored and the threshold reaches a prescribed management value. Here, the prescribed management value is determined based on a transition in the failure rate cumulative frequency of failure cases.

The wear rate determination unit 106 determines one of a plurality of types of "wear rate candidates" derived from the relation between the load factor or load change factor and the threshold as a wear rate to be used for monitoring the device 2.
(Flow of Processing of Monitoring Device)

Figure 3:
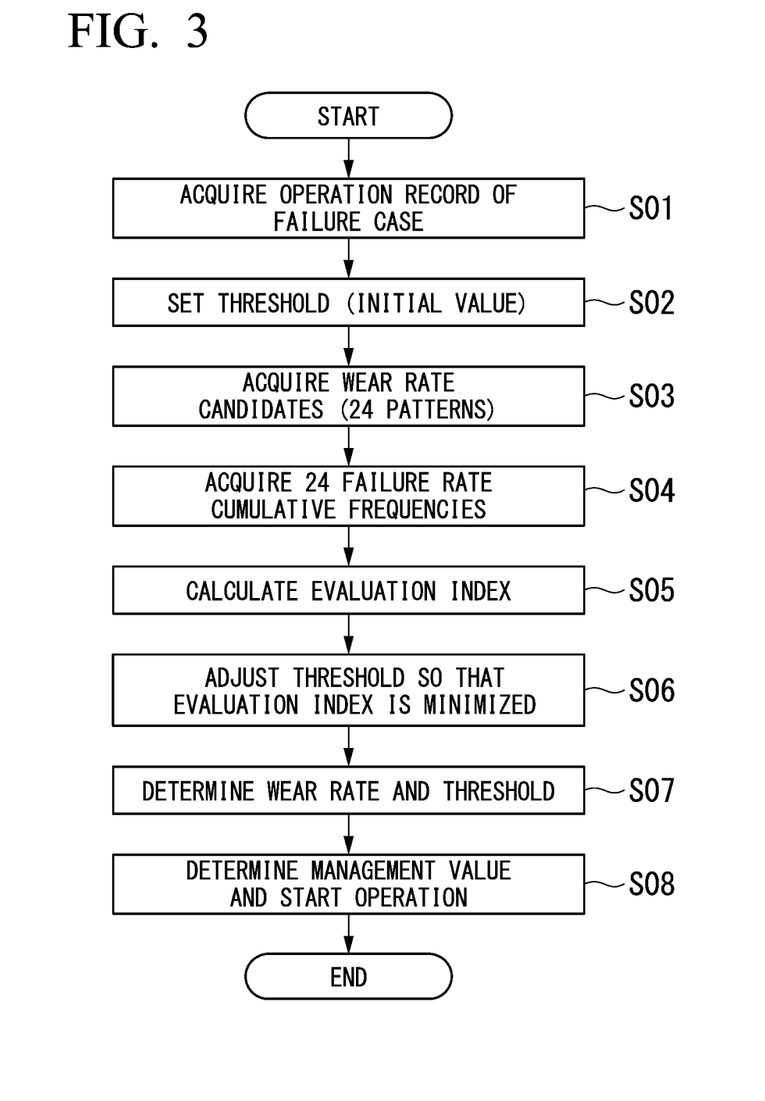
FIG. 3 is a diagram illustrating a flow of processing of the monitoring device according to the first embodiment.

FIG. 3 is a diagram illustrating a flow of processing of the monitoring device according to the first embodiment.

Figure 4:
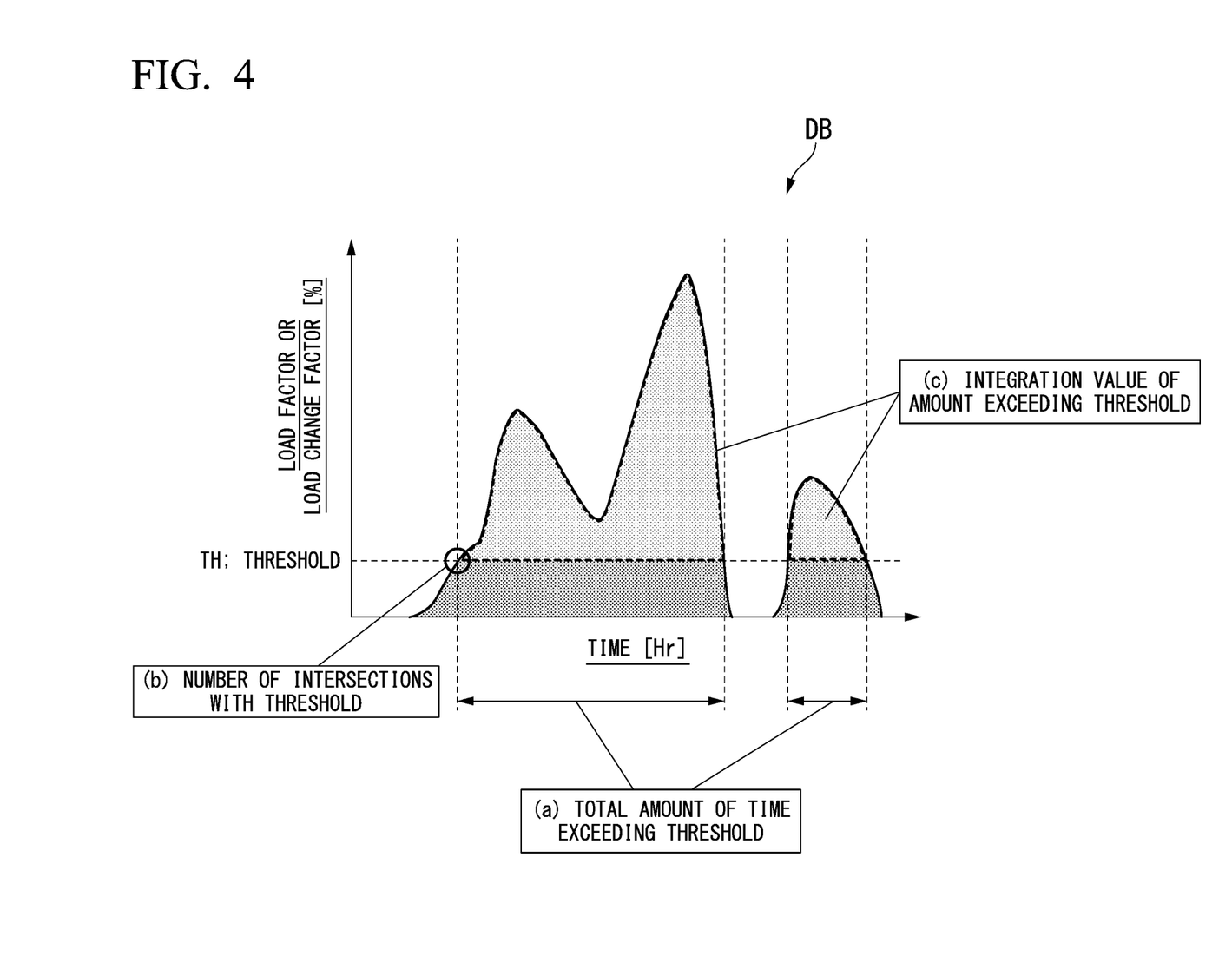
FIG. 4 is a diagram illustrating the content of processing of the monitoring device according to the first embodiment.
Figure 5:
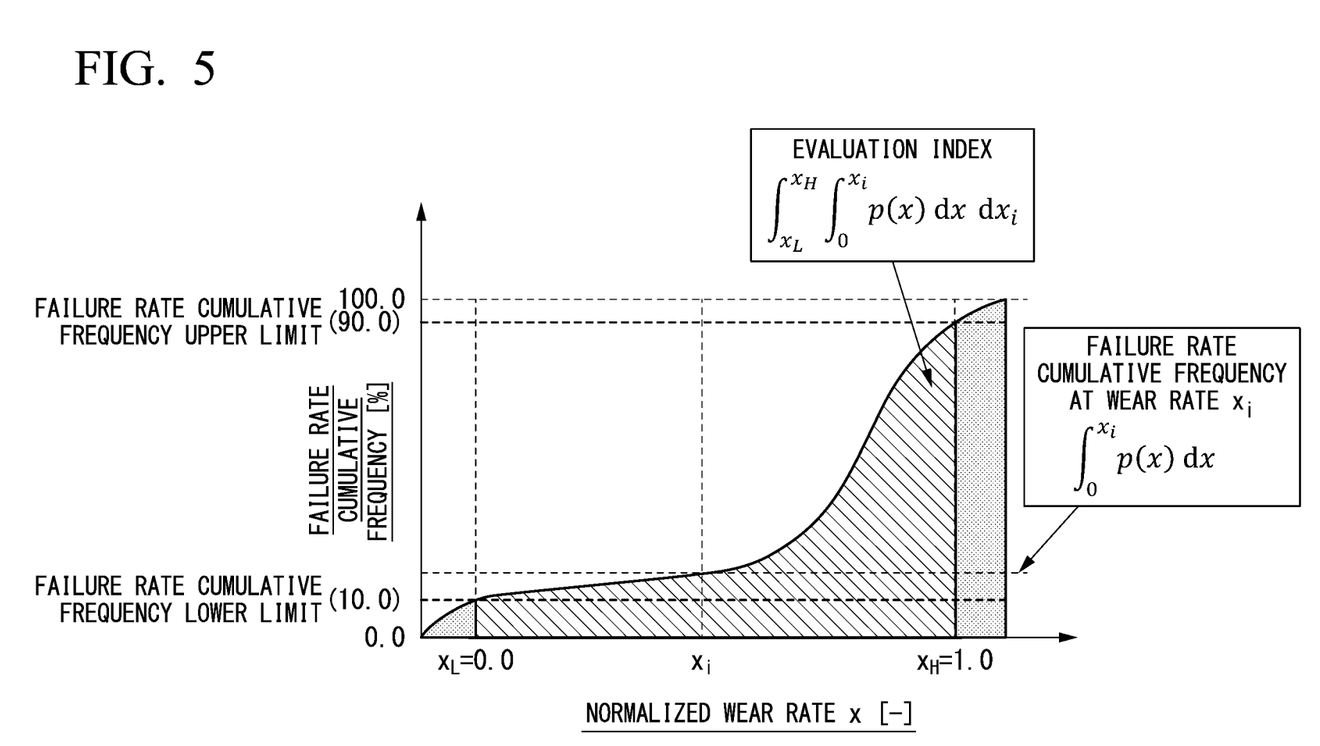
FIG. 5 is a diagram illustrating the content of processing of the monitoring device according to the first embodiment.

FIGS. 4 and 5 are diagrams illustrating the content of processing of the monitoring device according to the first embodiment.

Hereinafter, a flow of processing which is executed by the monitoring device 1 will be described in detail with reference to FIGS. 3 to 5.

The flow of processing of the monitoring device 1 shown in FIG. 3 is a flow of processing which is executed at the stage before the device 2 is monitored, and is a flow of processing for setting a management value for appropriately alerting the device 2 to be monitored.

The operation record acquisition unit 100 of the monitoring device 1 first acquires the operation record DB for a plurality of past failure cases (step S01). Meanwhile, in the present embodiment, the operation record DB is recorded in the recording medium 13, but there is no limitation thereto in other embodiments. In other embodiments, the operation record DB may be recorded in an external device, and the operation record acquisition unit 100 may access the external device to acquire the operation record DB.

An example of the operation record DB will be described below with reference to FIG. 4.

As shown in FIG. 4, the operation record DB records the time history of the load factor or load change factor from the start of operation to the failure in failure cases. Here, the load factor is a value indicating the degree of load during operation of the device 2. In a case where the device 2 is a large-sized refrigerating machine, the load factor may be the power consumption (W) or rotation speed (rpm) of a compressor. In addition, the load factor may be the magnitude of vibration obtained through a vibration sensor, a temperature observation value obtained by a temperature sensor, or the like.

In addition, the load change factor is a value indicating the degree of change in the load factor, and may be calculated, for example, from the time derivative of the observation value of the load factor.

Referring back to FIG. 3, next, the threshold setting unit 101 of the monitoring device 1 sets a threshold TH for contrasting with the load factor or load change factor of each operation record DB (step S02). Meanwhile, the threshold TH set here is a temporary value as an initial value, and is adjusted to an optimum value in a later step.

Next, the wear rate acquisition unit 102 of the monitoring device 1 acquires a "wear rate candidate" that is a value derived from the relation between the load factor or load change factor and the threshold TH (step S03).

Here, the processes of steps S02 and S03 will be described in detail with reference to FIG. 4.

The wear rate is a value indicating the degree of progress of wear of the device 2 according to the operation time. In the present embodiment, as shown in FIG. 4, the wear rate is one selected from 24 patterns of "wear rate candidates" consisting of the following combinations (1) to (3).

(1) Load factor or load change factor (2 patterns)
(2) Load factor or load change factor to the power of 1 to 4 (4 patterns)
(3) The following conditions (a) to (c) (3 patterns)
(a) . . . Total amount of time during which the load factor or load change factor exceeds the threshold TH
(b) . . . The number of times the load factor or load change factor intersects the threshold TH
(c) . . . Time integration value of an amount by which the load factor or load change factor exceeds the threshold TH.

Referring back to FIG. 3, next, the failure rate cumulative frequency acquisition unit 103 of the monitoring device 1 acquires the failure rate cumulative frequency for each of the 24 patterns of "wear rate candidates" (step S04).

Here, the process of step S04 will be described in detail with reference to FIG. 5.

In the graph shown in FIG. 5, the horizontal axis represents the wear rate at a point in time of failure in each failure case, and the vertical axis represents the ratio of the cumulative number of devices that have failed before reaching the wear rate to the total number (failure rate cumulative frequency). For example, in the example shown in FIG. 5, the failure rate cumulative frequency at the wear rate xi is represented by the following Expression (1).

[Math. 1]

$$\int_0^{x_i} p(x)dx \quad (1)$$

In the present embodiment, 24 graphs shown in FIG. 5 are created for each of the "wear rate candidates" described above. Meanwhile, although the units of the "wear rate candidates" are different from each other for each of 24 patterns, the units are normalized in the range of 0 to 1 so that they can be compared with each other (see the horizontal axis of the graph of FIG. 5).

In addition, in the example shown in FIG. 5, the lower limit of the failure rate cumulative frequency is set to a value larger than 0% (for example, 10%), and the upper limit of the failure rate cumulative frequency is set to a value smaller than 100% (for example, 90%). In this manner, the accuracy of determination using the failure rate cumulative frequency can be improved by excluding failure cases in a range in which abnormal values are likely to be included (a range in which the failure rate cumulative frequency is close to 0 or 100).

Referring back to FIG. 3, next, the evaluation index calculation unit 104 of the monitoring device 1 calculates an evaluation index from each of the 24 failure rate cumulative frequencies obtained in step S04 (step S05).

Here, the process of step S05 will be described in detail with reference to FIG. 5.

The evaluation index is a value obtained by integrating the failure rate cumulative frequency (Expression (1)) obtained in step S04 with the wear rate in the range of xL(0) to xH(1), and is represented as in Expression (2).

[Math. 2]

$$\int_{x_L}^{x_H} \int_0^{x_i} p(x)dx \, dx_i \quad (2)$$

That is, the evaluation index is an area of the range of xL to xH in the graph of the failure rate cumulative frequency shown in FIG. 5.

Referring back to FIG. 3, next, the threshold setting unit 101 of the monitoring device 1 adjusts the threshold TH so that the evaluation index obtained in step S05 (the area of the failure rate cumulative frequency in FIG. 5) is minimized (step S06).

Specifically, the threshold setting unit 101 increases or decreases the threshold TH (initial value) set in step S02. Then, since the wear rate xi changes as the threshold TH increases or decreases (see FIG. 4), the evaluation index also changes in accordance with this change in the wear rate xi. The threshold setting unit 101 searches for the threshold TH at which the evaluation index becomes a minimum value while referring to the result of calculation of the evaluation index.

The threshold setting unit 101 specifies the threshold TH at which the evaluation index is minimized for each of the 24 failure rate cumulative frequencies. As a result, 24 thresholds TH at which the areas of the 24 failure rate cumulative frequencies are minimizes are specified.

Next, the wear rate determination unit 106 of the monitoring device 1 specifies one of the "wear rate candidates" that obtained the smallest value among the 24 "minimum values of evaluation indexes" calculated for each of the 24 failure rate cumulative frequencies and the threshold TH for giving the "minimum value of the evaluation index." The wear rate determination unit 106 determines a set of one of the "wear rate candidates" and the threshold TH as the wear rate to be used for monitoring the device 2 to be monitored and the threshold TH (step S07).

Finally, a management value for the wear rate (determination threshold for issuing an alert) is determined. The monitoring device 1 calculates the wear rate using the wear rate determined in step S07 and the threshold TH from an operation history which is received from the device 2 to be monitored from time to time, and monitors the device 2 (step S08). The management value of the wear rate may be determined by an operator's decision from the graph of the failure rate cumulative frequency obtained using the threshold TH in step S07.

(Operation and Effects)

The operation and effects of the monitoring device 1 according to the present embodiment will be described with reference to FIG. 5. The threshold setting unit 101 according to the present embodiment is adjusted so that the evaluation index is minimized (see step S06 in FIG. 3). In this way, the integration value (area) from xL to xH in the graph of the failure rate cumulative frequency in FIG. 5 is minimized. This integration value (area) is minimized, and thus it is possible to select a threshold TH having characteristics such that the failure rate cumulative frequency (vertical axis in FIG. 5) rises as steeply as possible with respect to the wear rate (horizontal axis in FIG. 5). This makes it possible to appropriately issue an alert at the stage immediately before a sign of failure begins by selecting the wear rate immediately before the failure rate cumulative frequency rise steeply as the "management value."

As described above, according to the monitoring device 1 of the first embodiment, since preservation and maintenance are performed based on the wear rate according to the actual operation results (failure cases), it is possible to suppress the occurrence of excessive maintenance, unplanned stoppage, or the like, and to appropriately perform preservation and maintenance.

In addition, the monitoring device 1 according to the first embodiment calculates the evaluation index corresponding to each of a plurality of types (24 patterns) of "wear rate candidates," and sets the threshold TH at which the corresponding evaluation index is minimized for each of the plurality of types of "wear rate candidates." The monitoring device 1 (the wear rate determination unit 106) determines a wear rate candidate having the smallest "minimum value of the evaluation index" for the set threshold TH as the wear rate to be used for monitoring the device 2.

In this way, even though it is unclear with what parameters monitoring should be performed in order to correctly determine the end of the life, it is possible to select an optimal parameter (wear rate) for determining the life of the product from the past failure cases.

Second Embodiment

Next, a monitoring device according to a second embodiment will be described in detail with reference to FIG. 6.

(Processing of Monitoring Device According to Second Embodiment)

Figure 6:
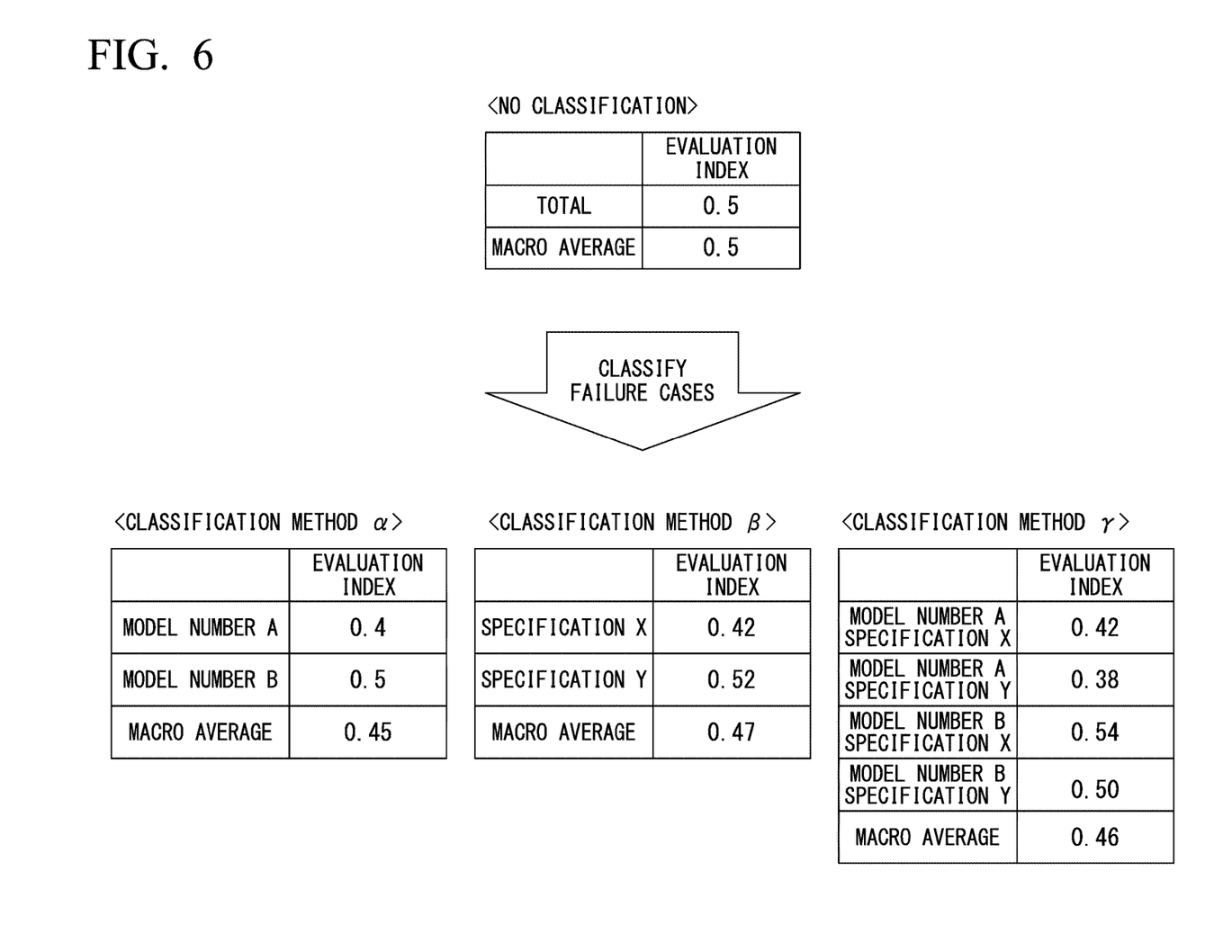
FIG. 6 is a diagram illustrating the content of processing of a monitoring device according to a second embodiment.

FIG. 6 is a diagram illustrating the content of processing of the monitoring device according to the second embodiment.

The evaluation index calculation unit 104 according to the present embodiment calculates a macro average (which will be described later) of evaluation indexes for each classification group of the devices 2 classified in accordance with one of a plurality of classification methods for each of the plurality of classification methods.

In addition, the threshold setting unit 101 according to the present embodiment sets the threshold TH so that the macro average is minimized.

Hereinafter, the content of processing of the monitoring device 1 according to the present embodiment will be described in detail with reference to FIG. 6.

It is assumed that the device 2 according to the present embodiment is a large-sized refrigerating machine and that, for example, the following three classification methods of ($\alpha$), ($\beta$), and ($\gamma$) can be considered.

($\alpha$) Classification only by model number ($\beta$) Classification only by specification ($\gamma$) Classification by combination model number and specification The evaluation index calculation unit 104 according to the present embodiment calculates an evaluation index for each classification group classified by classification methods ($\alpha$), ($\beta$), and ($\gamma$) for a plurality of failure cases. The details are as follows.

The processing of the evaluation index calculation unit 104 will be described using the classification method ($\alpha$) as an example.

The evaluation index calculation unit 104 extracts an operation record DB of failure cases belonging to the classification group "model number A" among all the failure cases, sets a predetermined threshold TH (initial value) for the operation record DB, and calculates an evaluation index for each "wear rate candidate."

Next, the evaluation index calculation unit 104 extracts an operation record DB of failure cases belonging to the classification group "model number B" among all the failure cases, sets a predetermined threshold TH (initial value) for the operation record DB, and calculates an evaluation index for each "wear rate candidate."

A classification method specification unit 107 then calculates an macro average of evaluation indexes of each of the "model number A" and the "model number B."

The threshold setting unit 101 increases or decreases the threshold TH common to the "model number A" and the "model number B" to search for the threshold TH at which the macro average is minimized.

The example shown in FIG. 6 shows that in a case where the classification method ($\alpha$) is adopted, a minimum macro average value of 0.45 was obtained for one of certain "wear rate candidates" at a certain threshold TH.

Similarly for the classification methods ($\beta$) and ($\gamma$), the monitoring device 1 increases or decreases the threshold TH which is commonly applied to the classification groups to search for the "wear rate candidate" and the threshold TH at which the macro average is minimized.

The example shown in FIG. 6 shows that in a case where the classification method ($\beta$) is adopted, a minimum macro average value of 0.47 was obtained for one of certain "wear rate candidates" at a certain threshold TH. In addition, the example shown in FIG. 6 shows that in a case where the classification method (c) is adopted, a minimum macro average value of 0.46 was obtained for one of certain "wear rate candidates" at a certain threshold TH.

The monitoring device 1 monitors the device 2 by adopting the "wear rate candidate" and the threshold TH at which the macro average is minimized.

As described above, the evaluation index calculation unit 104 calculates the macro average of evaluation indexes for each classification group of devices classified in accordance with each of the plurality of classification methods ($\alpha$), ($\beta$), and ($\gamma$) for each of the plurality of classification methods. The threshold setting unit 101 then sets the threshold TH so that the macro average is minimized.

(Operation and Effects)

As described above, according to the monitoring device 1 of the second embodiment, a more appropriate "wear rate candidate" and threshold TH are specified based on the macro average of evaluation indexes calculated for each classification method.

Third Embodiment

Next, a monitoring device according to a third embodiment will be described in detail with reference to FIG. 7.

(Processing of Monitoring Device According to Third Embodiment)

Figure 7:
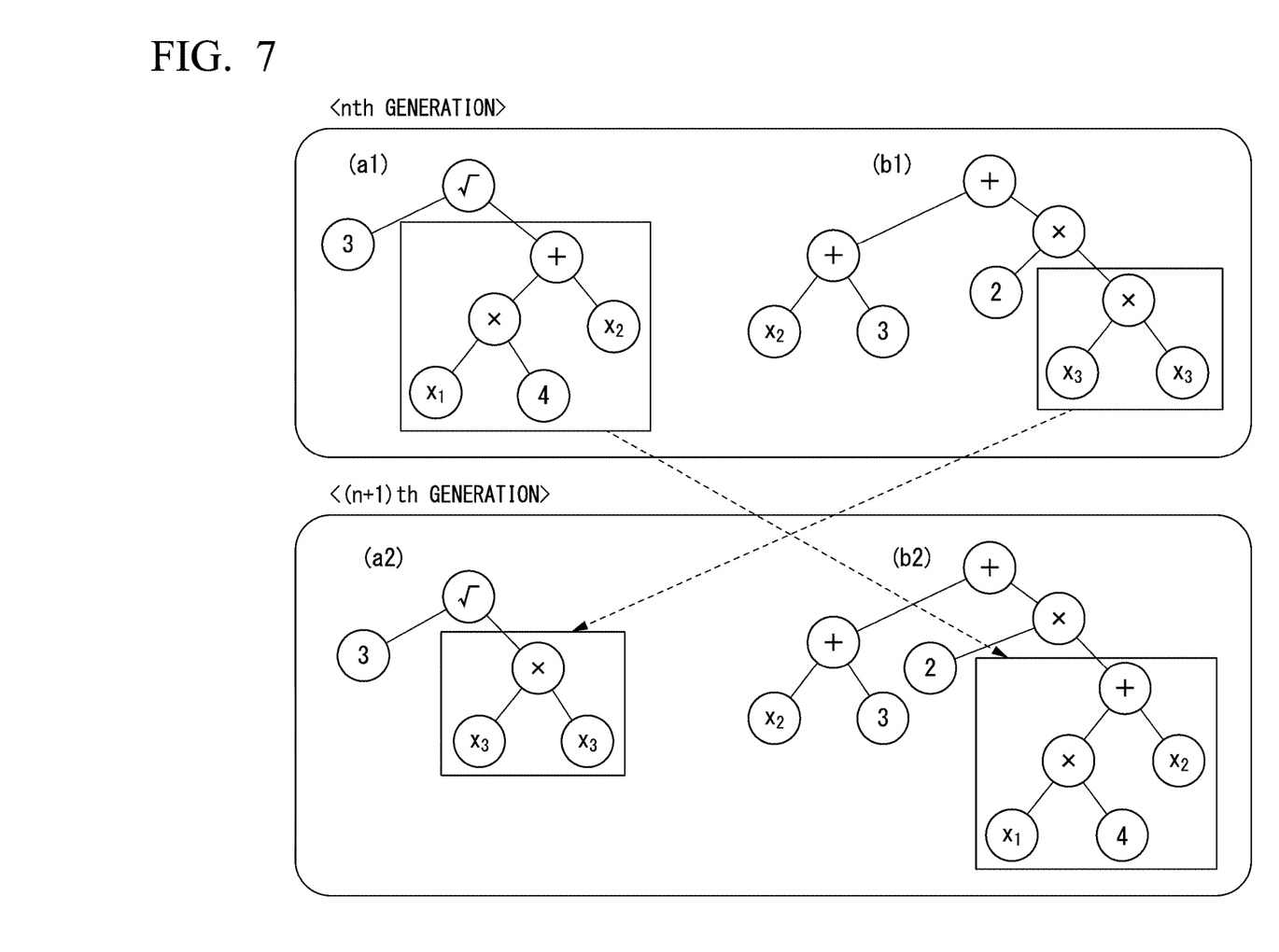
FIG. 7 is a diagram illustrating the content of processing of a monitoring device according to a third embodiment.

FIG. 7 is a diagram illustrating the content of processing of the monitoring device according to the third embodiment.

The wear rate acquisition unit 102 according to the present embodiment further searches for a combination of wear rate candidates at which the evaluation index is minimized in addition to the functions of the first embodiment. Hereinafter, the processing of the wear rate acquisition unit 102 according to the third embodiment will be described in detail.

In addition, x1, x2, x3, . . . shown in FIG. 7 are each of a plurality of types (24 patterns) of "wear rate candidates." The wear rate acquisition unit 102 according to the third embodiment uses genetic programming to search for a combination of "wear rate candidates" that yields the smallest evaluation index.

Specifically, as shown in FIG. 7, some elements are first extracted from each of combinations (a1), (b1), . . . of a plurality of types of "wear rate candidates" belonging to the nth generation and incorporated into some of the other combinations. In the example shown in FIG. 7, the wear rate acquisition unit 102 incorporates some elements of the combination (a1) into the nth generation combination (b1) to create the (n+1)th generation combination (b2). Similarly, the wear rate acquisition unit 102 incorporates some elements of the combination (b1) into the nth generation combination (a1) to create the (n+1)th generation combination (a2).

The minimum value of the evaluation index in a case where each of a plurality of types of combinations (a2), (b2), . . . belonging to the (n+1)th generation obtained in this way is adopted as the wear rate (horizontal axis of the graph in FIG. 5) is searched for by increasing or decreasing the threshold TH as in the first embodiment. Among these combinations (a2), (b2), . . . , only combinations that can further reduce the minimum value of the evaluation index are then selected to create a combination for the next generation ((n+2)th generation).

In this way, it is possible to further pursue the minimization of the evaluation index by defining the "wear rate" as a combination of a plurality of variables (wear rate candidates) rather than defining any one of the 24 patterns of "wear rate candidates" alone as the "wear rate". As a result, the "wear rate" used for monitoring the device 2 and its management value can be made more appropriate.

<Addition>

A monitoring device, a monitoring method, and a recording medium storing a program according to each embodiment are ascertained, for example, as follows.

(1) According to a first aspect, there is provided a monitoring device 1 including: an operation record acquisition unit 100 configured to acquire operation records indicating a transition in a load factor or a load change factor with respect to operation time leading up to failure in a plurality of failure cases; a threshold setting unit 101 configured to set a threshold to be contrasted with the load factor or the load change factor in the operation records of the plurality of failure cases; a wear rate acquisition unit 102 configured to acquire a wear rate that is a value derived from a relation between the load factor or the load change factor and the threshold and indicates a degree of progress of wear of a device according to operation time; a failure rate cumulative frequency acquisition unit 103 configured to acquire a transition in a failure rate cumulative frequency of the plurality of failure cases with respect to the wear rate; an evaluation index calculation unit 104 configured to calculate an evaluation index that is a value obtained by integrating the failure rate cumulative frequency with the wear rate; and a notification unit 105 configured to notify that maintenance is required when the wear rate derived from the relation between the threshold and the load factor or the load change factor of the device to be monitored reaches a prescribed management value determined based on the transition in the failure rate cumulative frequency of the failure cases. The threshold setting unit 101 is configured to set the threshold so that the evaluation index is minimized.

(2) According to a second aspect, the monitoring device 1 further includes a wear rate determination unit 106 configured to determine one of a plurality of types of wear rate candidates derived from the relation between the load factor or the load change factor and the threshold as a wear rate to be used for monitoring. The evaluation index calculation unit 104 is configured to calculate the evaluation index corresponding to each of the plurality of types of wear rate candidates, the threshold setting unit 101 is configured to set the threshold at which the corresponding evaluation index is minimized for each of the plurality of types of wear rate candidates, and, the wear rate determination unit 106 is configured to determine a wear rate candidate having a smallest minimum value of the evaluation index in the set threshold as the wear rate to be used for monitoring.

(3) According to the monitoring device 1 of a third aspect, the wear rate acquisition unit 102 is configured to further search for a combination of the wear rate candidates at which the evaluation index is minimized.

(4) According to the monitoring device 1 of a fourth aspect, the wear rate is a total amount of time during which the load factor or load change factor exceeds the threshold, the number of times the load factor or the load change factor intersects the threshold, or a time integration value of an amount by which the load factor or the load change factor exceeds the threshold.

(5) According to the monitoring device 1 of a fifth aspect, the evaluation index calculation unit 104 is configured to calculate a macro average of the evaluation indexes for each classification group of the devices classified in accordance with one of a plurality of classification methods for each of the plurality of classification methods, and, the threshold setting unit 101 is configured to set the threshold so that the macro average is minimized.

(6) According to a sixth aspect, there is provided a monitoring method including: a step of acquiring operation records indicating a transition in a load factor or a load change factor with respect to operation time leading up to failure in a plurality of failure cases; a step of setting a threshold to be contrasted with the load factor or the load change factor in the operation records of the plurality of failure cases; a step of acquiring a wear rate that is a value derived from a relation between the load factor or the load change factor and the threshold and indicates a degree of progress of wear of a device according to operation time; a step of acquiring a transition in a failure rate cumulative frequency of the plurality of failure cases with respect to the wear rate; a step of calculating an evaluation index that is a value obtained by integrating the failure rate cumulative frequency with the wear rate; and a step of notifying that maintenance is required when the wear rate derived from the relation between the threshold and the load factor or the load change factor of the device to be monitored reaches a prescribed management value determined based on the transition in the failure rate cumulative frequency of the failure cases, wherein the step of setting the threshold includes setting the threshold so that the evaluation index is minimized.

(7) According to a seventh aspect, there is provided a non-transitory computer readable recording medium storing a program causing a computer to execute: a step of acquiring operation records indicating a transition in a load factor or a load change factor with respect to operation time leading up to failure in a plurality of failure cases; a step of setting a threshold to be contrasted with the load factor or the load change factor in the operation records of the plurality of failure cases; a step of acquiring a wear rate that is a value derived from a relation between the load factor or the load change factor and the threshold and indicates a degree of progress of wear of a device according to operation time; a step of acquiring a transition in a failure rate cumulative frequency of the plurality of failure cases with respect to the wear rate; a step of calculating an evaluation index that is a value obtained by integrating the failure rate cumulative frequency with the wear rate; and a step of notifying that maintenance is required when the wear rate derived from the relation between the threshold and the load factor or the load change factor of the device to be monitored reaches a prescribed management value determined based on the transition in the failure rate cumulative frequency of the failure cases, wherein the step of setting the threshold includes setting the threshold so that the evaluation index is minimized.

INDUSTRIAL APPLICABILITY

According to each aspect of the present invention, it is possible to suppress the occurrence of excessive maintenance, unplanned stoppage, or the like, and to appropriately perform preservation and maintenance.

REFERENCE SIGNS LIST

1 Monitoring device
10 CPU
100 Operation record acquisition unit
101 Threshold setting unit
102 Wear rate acquisition unit
103 Failure rate cumulative frequency acquisition unit
104 Evaluation index calculation unit
105 Notification unit
11 Memory
12 Communication interface
13 Recording medium
2 Device

The invention claimed is:

1. A monitoring device comprising:
a central processing unit (CPU) that:
  accumulates, in a database, operation records indicating a transition in a load factor or a load change factor with respect to operation time leading up to failure in a plurality of failure cases,
  sets a threshold to be contrasted with the load factor or the load change factor in the operation records of the failure cases,
  based on a relation between the load factor or the load change factor and the threshold, calculates a wear rate that indicates a degree of progress of wear of each of devices to be monitored according to operation time,
  calculates a failure rate cumulative frequency of each of the failure cases that is a ratio of a cumulative number of the devices that have failed before reaching the wear rate to a total number of the devices by following formula (1), wherein the failure rate cumulative frequency is set to a value larger than 0 percent and less than 100 percent to exclude a range in which an abnormal value is likely to be included, $$\int_0^{x_i} p(x)dx \quad (1)$$

calculates an evaluation index that is a value obtained by integrating the failure rate cumulative frequency with the wear rate by following formula (2), $$\int_{x_L}^{x_H} \int_0^{x_i} p(x)dx\, dx_i \quad (2)$$

identifies the threshold at which the evaluation index becomes a minimum value,
  sets a management value for the wear rate based on the threshold that has been identified,
  monitors the devices based on an operation history obtained from each of the devices from time to time, and
  in response to the wear rate obtained from the operation history reaching the management value, notifies at least one of the devices that maintenance is required.

2. The monitoring device according to claim 1, wherein the CPU further:
  determines one of a plurality of wear rate candidates derived from the relation between the load factor or the load change factor and the threshold as a wear rate to be used for monitoring,
  calculates the evaluation index corresponding to each of the wear rate candidates,
  sets the threshold at which the corresponding evaluation index becomes the minimum value for each of the wear rate candidates, and
  determines a wear rate candidate having a smallest minimum value of the evaluation index in the set threshold as the wear rate to be used for monitoring.

3. The monitoring device according to claim 2, wherein the CPU further searches for a combination of the wear rate candidates at which the evaluation index becomes the minimum value.

4. The monitoring device according to claim 1, wherein the wear rate is a total amount of time during which the load factor or the load change factor exceeds the threshold, the number of times the load factor or the load change factor intersects the threshold, or a time integration value of an amount by which the load factor or the load change factor exceeds the threshold.

5. The monitoring device according to claim 1, wherein the CPU further:
calculates a macro average of the evaluation indexes for each classification group of the devices classified in accordance with one of a plurality of classification methods for each of the classification methods, and
sets the threshold at which the macro average becomes a minimum value.

6. A monitoring method comprising:
a step of accumulating, in a database, operation records indicating a transition in a load factor or a load change factor with respect to operation time leading up to failure in a plurality of failure cases;
a step of setting a threshold to be contrasted with the load factor or the load change factor in the operation records of the failure cases;
based on a relation between the load factor or the load change factor and the threshold, calculating a wear rate that indicates a degree of progress of wear of each of devices to be monitored according to operation time;
calculating a failure rate cumulative frequency of each of the failure cases that is a ratio of a cumulative number of the devices that have failed before reaching the wear rate to a total number of the devices by following formula (1), wherein the failure rate cumulative frequency is set to a value larger than 0 percent and less than 100 percent to exclude a range in which an abnormal value is likely to be included;

$$\int_0^{x_i} p(x)dx \tag{1}$$

a step of calculating an evaluation index that is a value obtained by integrating the failure rate cumulative frequency with the wear rate by following formula (2);

$$\int_{x_L}^{x_H} \int_0^{x_i} p(x)dx\, dx_i \tag{2}$$

a step of identifying the threshold at which the evaluation index becomes a minimum value;
a step of setting a management value for the wear rate based on the threshold that has been identified;
a step of monitoring the devices based on an operation history obtained from each of the devices from time to time; and
a step of, in response to the wear rate obtained from the operation history reaching the management value, notifying at least one of the devices that maintenance is required.

7. A non-transitory computer readable recording medium storing a program causing a computer to execute:
a step of accumulating, in a database, operation records indicating a transition in a load factor or a load change factor with respect to operation time leading up to failure in a plurality of failure cases;
a step of setting a threshold to be contrasted with the load factor or the load change factor in the operation records of the failure cases;
based on a relation between the load factor or the load change factor and the threshold, calculating a wear rate that indicates a degree of progress of wear of each of devices to be monitored according to operation time;
a step of calculating a failure rate cumulative frequency of each of the failure cases that is a ratio of a cumulative number of the devices that have failed before reaching the wear rate to a total number of the devices by following formula (1), wherein the failure rate cumulative frequency is set to a value larger than 0 percent and less than 100 percent to exclude a range in which an abnormal value is likely to be included;

$$\int_0^{x_i} p(x)dx \tag{1}$$

a step of calculating an evaluation index that is a value obtained by integrating the failure rate cumulative frequency with the wear rate by following formula (2);

$$\int_{x_L}^{x_H} \int_0^{x_i} p(x)dx\, dx_i \tag{2}$$

a step of identifying the threshold at which the evaluation index becomes a minimum value;
a step of setting a management value for the wear rate based on the threshold that has been identified;
a step of monitoring the devices based on an operation history obtained from each of the devices from time to time; and
a step of, in response to the wear rate obtained from the operation history reaching the management value, notifying at least one of the devices that maintenance is requird.

* * * * *